Figure 1:
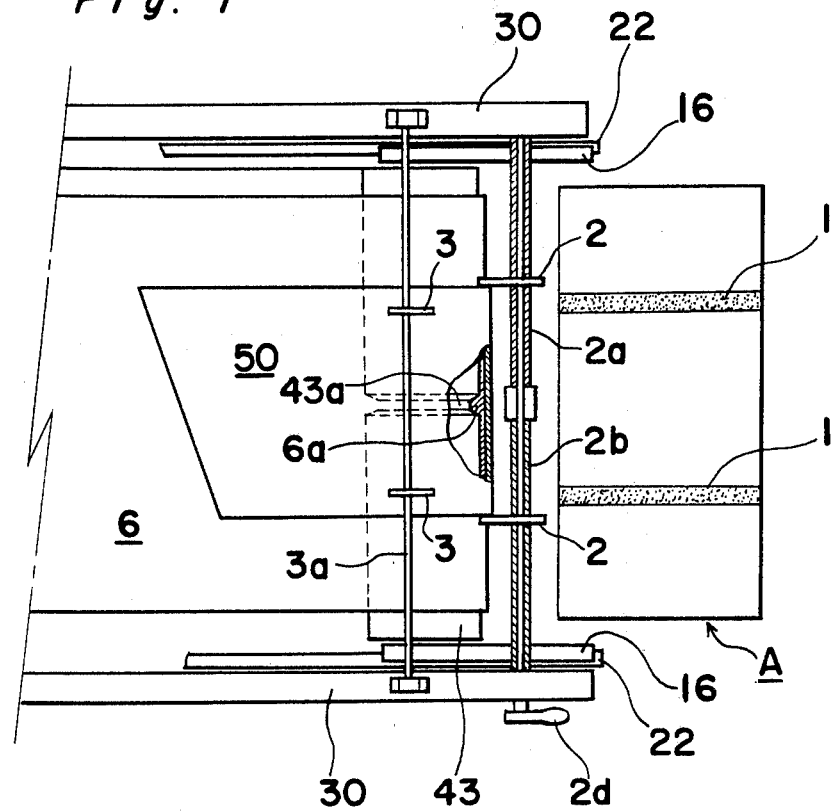

United States Patent [19]

Nakahama et al.

[11] 4,361,454
[45] Nov. 30, 1982

[54] PLY APPLYING APPARATUS AND METHOD FOR FORMING AN ELASTIC ANNULAR BODY

[75] Inventors: Kozo Nakahama, Kobe; Kazuo Kadomaru, Akashi; Masuzo Okaniwa, Sakai, all of Japan

[73] Assignee: Sumitomo Rubber Industries, Ltd., Hyogo, Japan

[21] Appl. No.: 247,558

[22] Filed: Mar. 25, 1981

[30] Foreign Application Priority Data

Apr. 1, 1980 [JP] Japan .................................. 55-43129

[51] Int. Cl.³ ...................... B29H 17/20; B65H 81/06
[52] U.S. Cl. ................................ 156/133; 156/110 R; 156/187; 156/188; 156/361; 156/363; 156/408; 156/413; 156/421; 156/447; 156/538; 156/576; 156/DIG. 6; 156/DIG. 11; 271/275; 271/277

[58] Field of Search ............... 156/110 R, 123 R, 128, 156/130, 133–134, 187–188, 394 R, 408, 413–414, 421, 361–363, 446–447, 538, 574, 576, DIG. 6, DIG. 11; 271/275–277

[56] References Cited

U.S. PATENT DOCUMENTS

| 1,960,822 | 5/1934 | Maney | 156/133 |
| 3,847,705 | 11/1974 | Habert et al. | 156/405 |
| 4,222,810 | 9/1980 | Ytterström | 156/447 |

Primary Examiner—Edward C. Kimlin
Assistant Examiner—Lois E. Boland
Attorney, Agent, or Firm—Birch, Stewart, Kolasch & Birch

[57] ABSTRACT

An automatic ply applying apparatus and method for forming an elastic annular body, such as a vehicle tire, by transporting each ply to a former, retaining a portion of the ply adjacent to the leading end of the former, applying the leading end portion of the ply to the peripheral surface of the former and applying the remaining portion of the ply to the peripheral surface of the former during rotation of the former.

9 Claims, 6 Drawing Figures

PLY APPLYING APPARATUS AND METHOD FOR FORMING AN ELASTIC ANNULAR BODY

The present invention relates to a ply applying apparatus and method for forming an elastic annular body and, more particularly, to a ply applying apparatus and method for applying plies made of raw rubber or elastic plastics or the like to a peripheral surface of a former for forming the elastic annular body such as a tire for a vehicle.

According to the prior art, a ply applying apparatus for forming a tire comprises a former for forming the tire thereon, a ply store mechanism for storing a roll of continuous strip and a transporting conveyance for transporting the strip drawn from the roll to the former.

With this conventional apparatus, the strip is drawn out from the roll, and the leading end of the respective strip is then engaged to the peripheral surface of the former after having been transported thereto by means of the transporting conveyance. Then, the former is rotated to wind up the strip therearound, the drive motor for rotating the former being electrically energized by closing a foot-operated pedal switch. After the strip has been wound around the former to form a ply, the strip is cut to a length corresponding to the circumference of the former. This procedure is repeated a number of times corresponding to the number of plies required in a particular vehicle tire.

It is to be noted that in the above construction of the conventional ply applying apparatus, the operation for applying plies requires complicated and time-consuming manual work, especially in engaging the leading end of the ply to the former and applying the ply on the former while being rotated.

In this way, the conventional apparatus has encountered many disadvantages. One of the disadvantages is that the productivity is low because of the necessity of manual labor. Another disadvantage is that the quality of the resulting product tends to vary from one product to another because of the following reasons if the attendant worker is unskilled:

(1) The tensions under which the respective ply on the former are held tend to be different from each other since the attendant worker presses each ply by his hand successively to the peripheral surface of the former while the former is rotated;

(2) The position of the joint of the opposite ends of each ply on the former tends to vary relative to a predetermined position on the former since the attendant worker manually engages the leading end of each ply to the peripheral surface of the former by eye-measurement. This should be avoided in view of the fact that, where the joints of the opposite ends of all of the plies on the former are regularly spaced from each other in a direction circumferentially about the former, the resultant tire can exhibit a balanced performance; and (3) The exact centering of the ply relative to the former is difficult to achieve since the centering operation is performed by eye-measurement.

Accordingly, the present invention is intended to provide a ply applying apparatus and method for forming an elastic annular body, such as a tire for vehicles, in which the entire process of applying plies is automatically performed, whereby a higher productivity and a stability in quality of the products can be achieved.

According to the present invention, the applying apparatus for forming an elastic annular body comprises a former supported for rotation in one direction for forming an elastic annular body; a ply transporting means for intermittently transporting plies to the former; an engaging means positioned on a peripheral surface of said former for causing the former to carry one of the plies which has been brought in direct contact with the former; a ply applicator means for applying the leading end portion of each ply, with respect to the direction of transportation of the plies, to the peripheral surface of the former; and a ply retainer means for retaining each ply transported to a predetermined position relative to the former, at a portion adjacent the leading end thereof in cooperation with the peripheral surface of the former before the leading end portion of each ply is applied by the ply applicator means, said retainer means being also operable to retain the remaining portion of each ply during the rotation of the former.

In the above construction of the ply applying apparatus, each ply transported by the ply transporting means is automatically applied to the peripheral surface of the former by the ply applicator means and the ply retainer means with no manual labor required. Accordingly, both higher productivity and stability in the quality of product are achieved.

Figure 6:
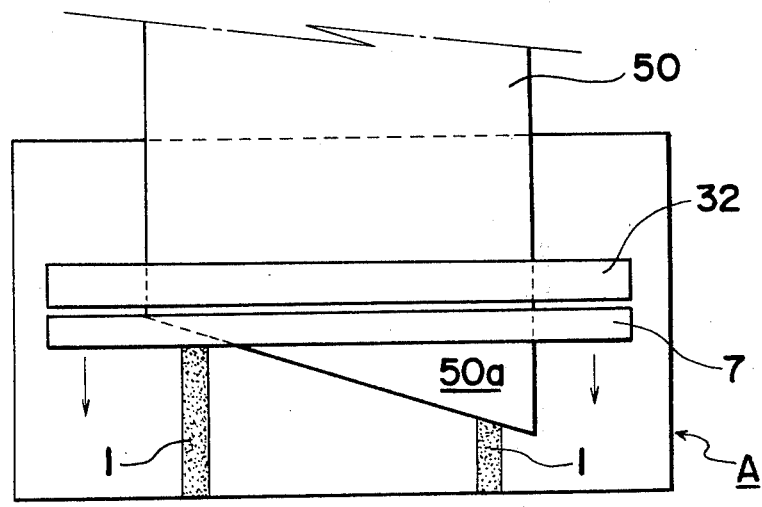
Figure 2:
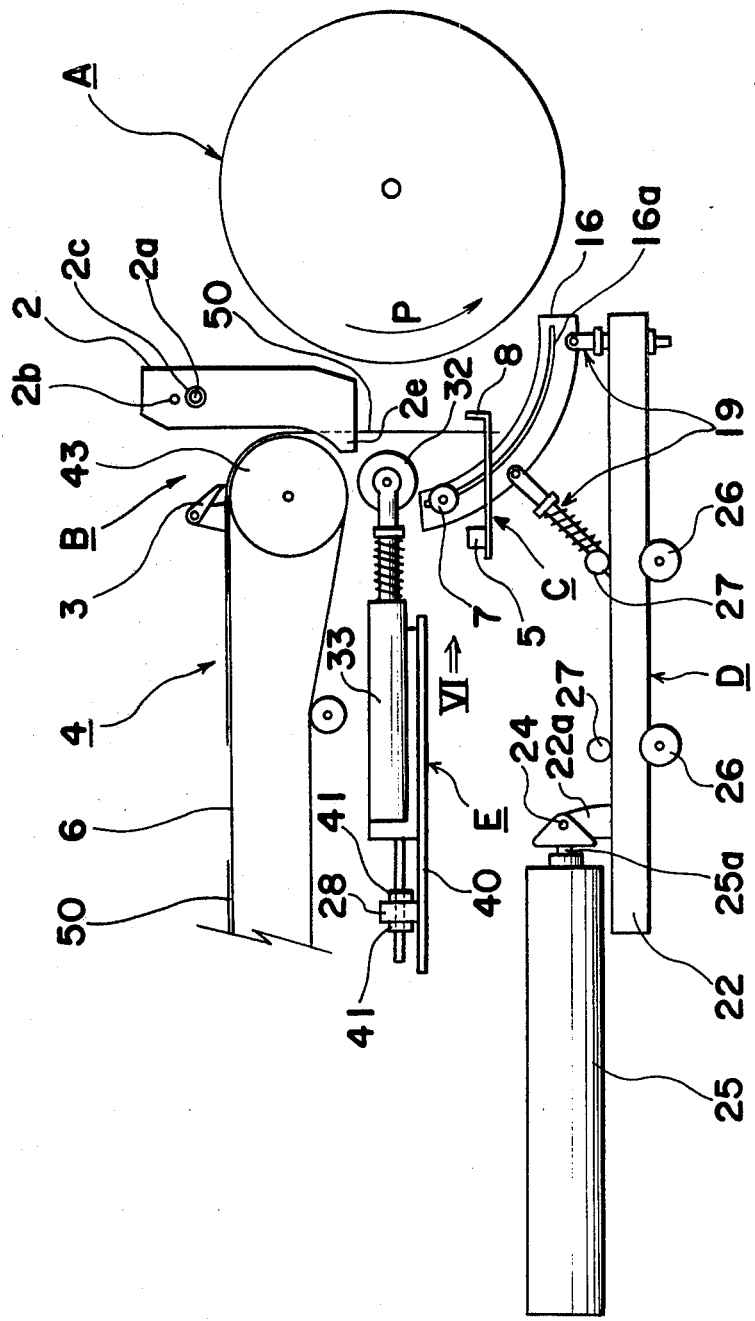
Figure 3:
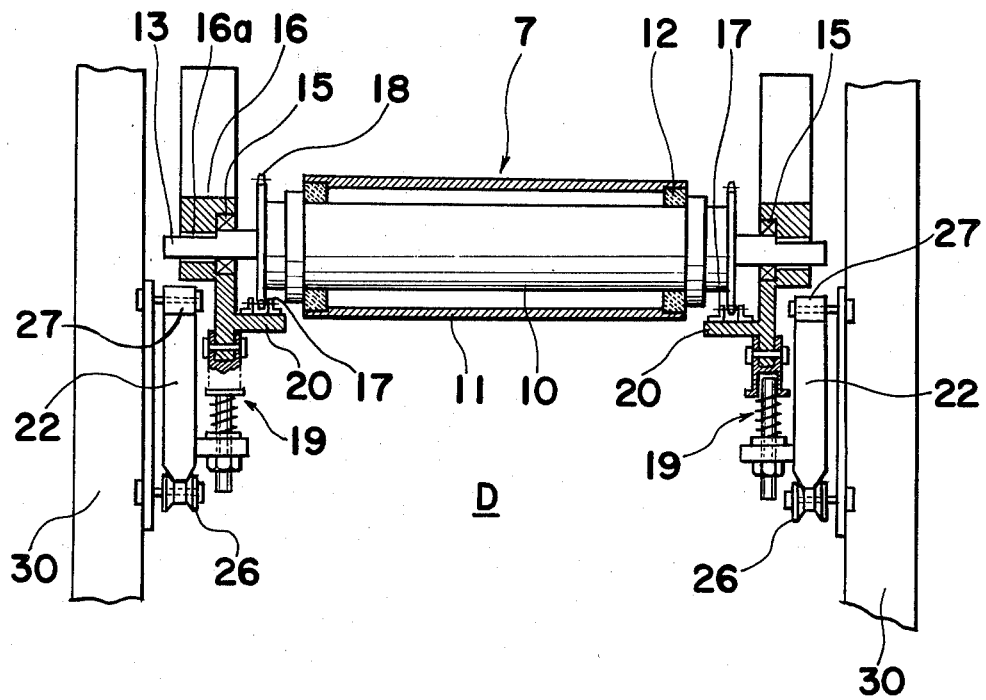
Figure 5:
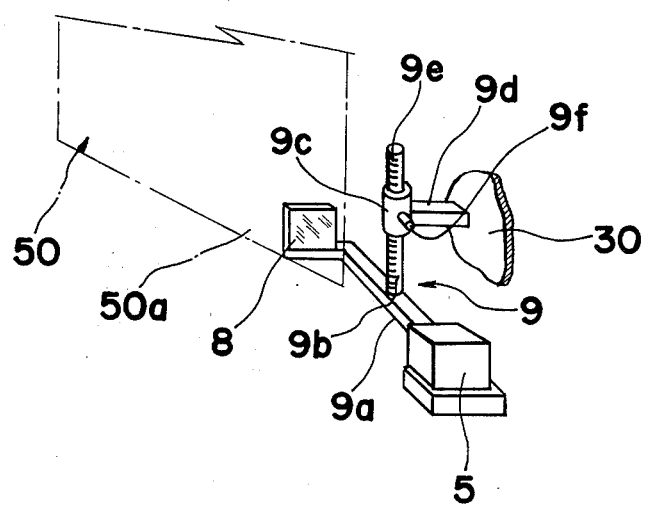
Figure 4:
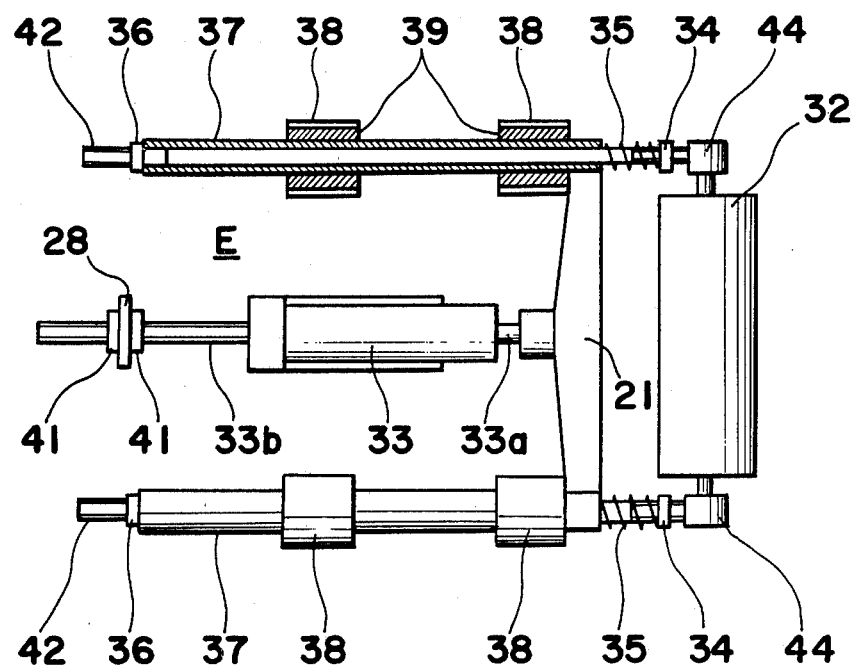

These and other objects and features of the present invention will become apparent from the following description taken in conjunction with a preferred embodiment thereof with reference to the accompanying drawings, in which;

FIG. 1 is a top plan view of a apparatus constructed in accordance with the present invention, FIG. 2 is a schematic side view of the apparatus of FIG. 1, with a frame removed, FIG. 3 is a partially sectional end view, on an enlarged scale, of a ply applicator mechanism used in the apparatus of FIG. 2, FIG. 4 is a top plan view, with a portion shown in section, showing a ply retaining mechanism used in the apparatus of FIG. 2, FIG. 5 is a perspective view of a detecting mechanism used in the apparatus of FIG. 2, and FIG. 6 is a schematic end view taken in the direction shown by arrow VI in FIG. 2, showing the state that a ply retaining roller and a ply pressing roller are pressing a slant cut end portion of the ply to the former.

Referring to FIG. 2, an apparatus according to the present invention is composed of the following five components, i.e., a former A for forming a tire thereon for vehicles, a ply transporting conveyance B for successively transporting plies towards the former A, a detecting mechanism C for detecting the position of each ply relative to the former A, a ply applicator mechanism D for applying the plies to the peripheral surface of the former A one at a time, and a ply retainer mechanism E for retaining the ply which has been applied to the peripheral surface of the former A. Each component will be hereinafter described in detail.

(I) Former A (FIGS. 1, 2 and 6)

Referring to FIGS. 1, 2 and 6, a former A is so designed that it can be rotated in a direction shown by the arrow P in FIG. 2 about the horizontal axis of rotation by a drive unit (not shown). Ribbon-shaped adhesives 1 are applied on the peripheral surface of the former A at two locations adjacent the opposite ends thereof so that a first applied ply 50, which is shown in this embodiment in the form of a cross-ply made of raw rubber and cut to a predetermined size with its opposite ends being slant, can adhere to the peripheral surface of the former A.

(II) Ply transporting conveyance B
(FIGS. 1 and 2)

Referring to FIGS. 1 and 2, a ply transporting conveyance B comprises an endless belt 6 which is horizontally moved by end rollers 43 and which has a guide projection 6a at the centre of the inner face thereof, said projection 6a being engaged in an annular groove 43a formed at the centre of the rollers 43 so as to avoid any lateral displacement of the endless belt 6 relative to the rollers 43.

A pair of guide plates 2 are mounted between the former A and the roller(s) 43 in order to avoid any possible lateral displacement of the ply, which is leaving from the belt 6, relative to the former, during transportation. When the leading end of the ply 50 with respect to the direction of transportation thereof leaves the endless belt 6 and extends downward as shown in FIG. 2, the projected portion 2e of each guide plate 2 guides each side of the ply 50. The pair of guide plates 2 are slidably supported by a guide rod 2b, each end of which is fixed on the frame 30. Each guide plate has a threaded opening 2c through which a threaded rod 2a, each end of which is journaled by the frame 30, is inserted. The rod 2a has two externally threaded portions so designed as to move the guide plates 2 in a direction close toward and away from each other depending on the direction of rotation of the rod 2a. Therefore, the space between the guide plates 2 can be adjusted to make it correspond to the width of each ply 50 by rotating the rod 2a via a handle 2d fixed to the one end thereof.

A pair of retainers 3 are slidably and pivotably mounted on a rod 3a, each end of which is fixed to the frame 30 at the position adjacent to the roller 43, in order to retain the trailing end of the ply 50 on the endless belt 6 and to prevent the ply 50 from falling from the belt 6 when the leading end of the ply 50 leaves the belt 6 at the position of the roller 43. Each retainer 3 is so designed as to contact the ply 50 which moves together with the endless belt 6 under friction without hampering a smooth delivery of the plies together with the belt 6.

(III) Detecting mechanism C
(FIGS. 2 and 5)

Referring to FIGS. 2 and 5, a detecting mechanism C is disposed under the retaining roller 32 of the ply retainer mechanism E for detecting the leading end of the ply 50 which is leaving and suspended from the belt 6.

The detecting mechanism C comprises a photoelectric detector 5, including a light emitter and a light sensor, positioned on one side of the suspended ply 50 and a mirror 8 positioned on the other side of the suspended ply 50, for reflecting the light from the light emitter toward the light sensor, both the photoelectric detector 5 and the mirror 8 being respectively mounted on opposite ends of a horizontal bar 9a of the supporting means 9. The supporting means 9 comprises a movable portion constructed by the horizontal bar 9a and a vertical rod 9b, with calibration 9e at the peripheral surface along the central axis thereof, the end of which is fixed to the centre of the horizontal bar 9a, and a fixed portion constructed by a arm 9d, one end of which is fixed to the frame 30, the other end of said arm 9d having a sleeve 9c mounted thereon for receiving the vertical rod 9b. The vertical rod 9b inserted in the sleeve 9c can be adjustably fixed to the sleeve 9c by means of a set screw 9f. The calibration 9e can simplify the height adjustment relative to the former A. When the leading end of the ply 50 descends from the belt 6 into the space between the photoelectric detector 5 and the mirror 8 to such an extent that the leading end of the ply interrupts the passage of the light emitted from the photoelectric detector 5, a signal is generated to stop the movement of the endless belt 6 and also to drive the ply applicator mechanism D.

(IV) Ply applicator mechanism D
(FIGS. 2 and 3)

Referring to FIGS. 2 and 3, a ply applicator mechanism D comprises a ply pressing roller 7 for applying the leading slant cut-end portion 50a of the ply 50 to the peripheral surface of the former A. As shown in FIG. 3, the roller 7 is of a known double-construction with an inner roller 10 and an outer roller 11. The inner roller 10 is housed within, and spaced by bushings 12 from, the outer roller 11, said rollers 10 and 11 being rotatable independently of each other. The inner roller 10 is rotatably mounted around the shaft 13, each end of which is inserted in a arcuate slot 16a of the corresponding guide plate 16, which is supported by a supporting plate 22 via shock absorbers 19 so that the axis of rotation of the ply pressing roller 7 is held horizontally, and also received by the bearing 15 slidably mounted in the slot 16a. An electric motor (not shown) is mounted in the inner roller 10 for rotating the inner roller 10 about the shaft 13. Each guide plate 16 has an arcuate bracket 20 along the arcuate slot 16a at a lower position of the slot 16a. This bracket 20 has a chain 17 rigidly mounted thereon and engaged to each sprocket wheel 18 mounted around each end of the inner roller 10. Thus, when the electric motor is driven, the inner roller 10 rotates to allow the entire roller 7 to move downwards or upwards along the chains 17, while each end of the shaft 13 does not rotate but slides in the arcuate slot 16a via the bearing 15. In addition, the curvature of each slot 16a corresponds to that of the peripheral surface of the former A.

Each supporting plate 22 is supported by lower guide pulleys 26 and upper guide rollers 27, which are rotatable on the frame 30, so as to enable the plate 22 to move between projected and retracted positions relative to the former A by driving each cylinder 25. The rod portion 25a of each cylinder 25 is pivotably connected to the end member 22a of each supporting plate 22 by means of a pin 24, while the entire cylinder 25 is pivotably coupled to the frame 30 by means of a pin (not shown), so that the horizontal motion of the supporting plates 22 is not adversely affected during assembling even if some errors exist horizontally between the supporting plates 22 and the cylinders 25. Preferably, each cylinder 25 comprises a braking means for stopping the roller 7 at a precise position relative to the former A.

(V) Ply retainer mechanism E
(FIGS. 2 and 4)

Referring to FIGS. 2 and 4 a ply retainer mechanism E comprises a ply retaining roller 32 for pressing and retaining the ply fed from the belt 6 of the ply transporting conveyance B to the former A, a pair of roller supporting rods 42 respectively coupled to each end of the roller 32, a pair of guide sleeves 37 for receiving each rod 42, and a cylinder 33 for pushing the ply retaining roller 32, together with the guide sleeves 37 and the roller supporting rods 42.

The peripheral surface of the ply retaining roller 32 is made of a soft material so as to decrease the meandering motion during application of the plies against the former A. As mentioned above, when soft material is employed, the pressure applied through the plies to the former A is reduced since the area, where the roller 32 comes into contact with the plies, increases. As a result, the plies can fit to the peripheral surface of the former A one at a time. Especially in case of a cross-ply having webs which are laid on bias relative to the longitudinal direction of the ply, the cross-ply will undergo a meandering motion on the former A, if rigid material is employed for the peripheral surface of the roller 32.

Each end of the retaining roller 32 is rotatably coupled to one end of each roller supporting rod 42 by means of a bearing box 44 so as to face the former A in parallel. Each roller supporting rod 42 is inserted into the guide sleeve 37 which is also slidably inserted into the bosses 38, fixed on the bench 40 supported by the frame 30, with bushings 39 provided respectively inside the bosses.

Each roller supporting rod 42 is threaded at its both ends. On the one of threaded ends of each rod 42, a compression spring 35 is inserted and also a pressure adjusting nut 34 for pressing the spring 35 against the end of the guide sleeve 37 is adapted to finely adjust the pressure caused when the retaining roller 32 has hit against the former A. On the other threaded end of each rod 42, a position adjusting nut 36 is mounted so as to contact the other end of the guide sleeves 37 for adjusting the position of the rods 42 relative to the guide sleeves, and, therefore, the position of the retaining roller 32 relative to the guide sleeves 37. Thus, the position of the retaining roller 32 relative to the former A can be adjusted separately without requiring a change in the strokes of the cylinder 33. And also, the parallelism of the retaining roller relative to the former A can be adjusted by separately adjusting the nuts 42.

The retaining roller 32 is moved between projected and retracted positions relative to the former A by the cylinder 33 which is slidably disposed, in the middle of the pair of guides 37, on the bench 40 supported by the frame 30. The rod portion 33a of the cylinder 33 is connected to both of the guide sleeves 37 via a connecting member 21.

The cylinder 33 has a bolt 33b for adjusting the position thereof, one end of the bolt being fixed to the rear end of the cylinder and extending behind along a longitudinal axis of the cylinder, while the other end of the bolt is adjustably fixed to the fixing member 28 on the bench 40 by means of nuts 41 so that the position of the cylinder 33 relative to the former A can be adjusted. Wherefor the hitting condition, i.e. the pressure of the roller 32 against the former A through the ply 50, can be properly adjusted.

The operating order of the apparatus mentioned above is as follows.

(1) The first ply 50 is transported by the endless belt 6 towards the former A, the leading end of each ply being hung at the position of the roller 43 without suddenly falling from the belt 6 because the retainers 3 retain the trailing end of the ply.

(2) The ply transporting conveyance B stops upon receiving the electric signal which is transmitted from the photoelectric detector 5 when the leading end of the ply 50 has passed the ply retaining mechanism E and interrupted the passage of the light emitted from the light emitter of the photoelectric detector 5, as shown in FIG. 2.

(3) The cylinder 33 of the ply retaining mechanism E is driven and consequently the retaining roller 32 is moved towards the former A so as to press a portion of the ply adjacent the leading end to the peripheral surface of the former A.

(4) The cylinder 25 of the ply applicator mechanism D is driven and consequently the pressing roller 7 is moved toward the former A so as to press the slant cut-end portion 50a to the surface of the former A. Subsequently, the electric motor in the inner roller 10 is driven, and consequently the inner roller 10 rotates and proceeds downward along the slots 16a, while the outer roller 11, which is in contact with the peripheral surface of the former A through the ply 50, roll over the former A. Thus, the slant cut-end portion of the ply 50a is pressed and bonded to the peripheral surface of the former A via the adhesives 1.

(5) The cylinder 25 of the ply applicator mechanism D is again driven so as to return the supporting plates 22 to the position shown in FIG. 2. Subsequently, the pressing roller 7 is returned to the upper position.

(6) The endless belt 6 is again rotated and at the same time the former A is rotated in the direction shown by the arrow P in FIG. 2, with the retaining roller 32 pressing and retaining the ply 50 to the surface of the former A. As a result, the first ply 50 is wound up around the former A, consequently, the entire ply 50 adheres to the peripheral surface of the former A via adhesives 1.

(7) Finally, the endless belt 6 and the former A come to a stop.

Although the above description applies to the first stage in which the first ply 50 is directly applied to the peripheral surface of the former A, the second and subsequent plies will be applied in the same method mentioned above. But it is to be noted that the second and subsequent plies will respectively be applied without the aid of adhesives to the preceding ply which has been applied to the former because the plies made of raw rubber can adhere each other under pressure.

Although the present invention has been described as applied to the formation of a tire for vehicles, it can also be applicable to the formation of, for example, a connecting sleeve for connecting two lengths of pipe or similar tube.

Although the present invention has been fully described by way of example with reference to the attached drawings, it is to be noted that various changes and modifications are apparent to those skilled in the art. For example, the adhesives which has been described as applied on the former in the preferred embodiment may be replaced by engaging needles or other suitable engaging members mounted on the peripheral surface of the former. Further, the detecting mechanism may be replaced by a timer for stopping the movement of the endless belt when the leading end of each ply reaches the predetermined position. Therefore, unless such changes and modifications depart from the scope of the present invention, they should be construed as included therein.

What is claimed is:

1. A ply applying method for forming an elastic annular body which comprises the steps of intermittently transporting said ply having a trailing end and a leading end towards a working station where the ply so transported is suspended from above with its trailing end resting on a transporting conveyor and its leading end positioned in front of a rotatable former for forming an elastic annular body thereon; pressing a portion of said ply adjacent to said leading end to the peripheral surface of said former by means of a retaining roller; applying said leading end portion to the peripheral surface of said former by causing a pressing roller to approach said former with said leading end portion being held between the pressing roller and the former and then causing the pressing roller to move angularly a specified distance along said peripheral surface of said former while rotating about its own axis in contact with said former with the leading end portion of said ply being positioned between said pressing roller and said peripheral surface of said former and each ply retained between said former and the retaining roller, and rotating said former so as to wind up the remaining portion of said ply thereon.

2. A ply applying apparatus for forming an elastic annular body which comprises a former supported for rotation in one direction for forming an elastic annular body on the peripheral surface thereof; a ply transporting means for intermittently transporting plies having a leading end and a trailing end to said former; an engaging means positioned on said peripheral surface of said former for causing said former to carry one of said plies which has been brought in direct contact with said former; a ply applicator means for applying said leading end portion of each ply, with respect to the direction of transportation of the plies, to the peripheral surface of said former wherein the ply applicator means comprises a ply pressing roller, for applying the leading end portion of each ply to the peripheral surface of said former, said pressing roller being of a double-construction including a motor-driven inner roller mounted about a shaft and an outer roller mounted coaxially on and externally of said inner roller for rotation independently of said inner roller, said inner roller having a sprocket wheel rigidly mounted on each end thereof and being rotatable independently of said outer roller and movable between upper and lower positions together with said outer roller; a pair of guide plates each provided with an arcuate slot of the same curvature as that of the peripheral surface of the former, said slots slidably receiving each end of said shaft; means for reciprocally moving said pair of guide plates between projected and retracted positions; a pair of chains fixedly supported by said respective guide plates and extending in parallel to said slots, said sprocket wheels being engaged in the respective chains such that, when said inner roller rotates, said inner roller moves along said slots with said sprocket wheel drivingly engaged in said chains, whereby, when said inner roller rotates and moves along said chains from the upper position towards the lower position after said guide plates have been moved to the projected position, the outer roller presses the leading end portion of each ply to the peripheral surface of the former and relatively rolls over the former with the leading end portion of each ply engaged to the peripheral surface of the former; and a ply retainer means for retaining each ply transported to a predetermined position relative to said former, at a portion adjacent said leading end thereof in cooperation with the peripheral surface of said former before the leading end portion of each ply is applied by the ply applicator means, said retainer means also operating to retain the remaining portion of each ply during the rotation of the former.

3. A ply applying apparatus as claimed in claim 2, wherein said engaging means comprises adhesive applied on the peripheral surface of said former.

4. A ply applying apparatus as claimed in claim 2, wherein said ply transporting means comprises an endless belt, and further includes a pair of guide plates for respectively guiding opposite sides of each of the plies being transported by said endless belt so as to avoid any possible lateral displacement of said plies which would occur as the ply leaves the endless belt.

5. A ply applying apparatus as claimed in claim 4, wherein said guide plates are supported for movement in a direction toward and away from each other for adjusting the space defined therebetween according to the width of each of the plies as measured in a direction transversely of the direction of transportation thereof.

6. A ply applying apparatus as claimed in claim 4, wherein said ply transporting means further comprises retainers for retaining each ply from falling arbitrarily from said endless belt when the ply leaves said endless belt.

7. A ply applying apparatus as claimed in claim 2, further comprising a detecting mechanism for detecting the position of the leading end of each ply which has left said endless belt, relative to the former, and generating a signal utilizable to stop the drive of the transporting means.

8. A ply applying apparatus as claimed in claim 7, wherein the detecting mechanism comprises a photoelectric detector supported for adjustment in a direction perpendicular to the axis of rotation of the former.

9. A ply applying apparatus as claimed in claim 2, wherein said ply retainer means comprises a ply pressing roller for pressing and retaining the portion of each ply adjacent the leading end of said ply to the peripheral surface of the former, means for supporting said pressing roller, said supporting means being movable between first and second positions away from and towards said former, respectively, said pressing roller pressing and retaining said ply when said supporting means is moved from the first position to the second position.

* * * * *